US009761077B2

(12) United States Patent
Kayani

(10) Patent No.: US 9,761,077 B2
(45) Date of Patent: Sep. 12, 2017

(54) BANK NOTE PROCESSING SYSTEM HAVING A COMBINED FLORESCENCE AND PHOSPHORESCENCE DETECTION SYSTEM

(71) Applicant: Toshiba International Corporation, Houston, TX (US)

(72) Inventor: Sohail Kayani, Irving, TX (US)

(73) Assignee: Toshiba International Corporation, Houston, TX (US)

( * ) Notice: Subject to any disclaimer, the term of this patent is extended or adjusted under 35 U.S.C. 154(b) by 0 days.

(21) Appl. No.: 14/322,467

(22) Filed: Jul. 2, 2014

(65) Prior Publication Data

US 2016/0005252 A1 Jan. 7, 2016

(51) Int. Cl.
*G07F 7/04* (2006.01)
*G06K 7/00* (2006.01)
(Continued)

(52) U.S. Cl.
CPC ......... *G07D 7/122* (2013.01); *G07D 11/0021* (2013.01); *G07D 11/0084* (2013.01);
(Continued)

(58) Field of Classification Search
CPC G07D 7/004; G07D 7/06; G07D 7/12; G07D 7/121–7/124; G07D 7/0006; G07D 7/00; G07D 7/0013; G07D 7/002; G07D 7/0026; G07D 7/0033; G07D 7/08; G07D 7/10; G07D 7/125; G07D 7/127; G07D 7/128; G07D 7/20; G07D 7/2008; G07D 7/2016; G07D 7/2025; G07D 7/2033; G07D 7/2041; G07D 7/205; G07D 7/2058; G07D 7/2066; G07D 11/0084; G07D 11/0087; G07D 11/0096; G07D 13/00; G07D 2207/00; G07D 2211/00
(Continued)

(56) References Cited

U.S. PATENT DOCUMENTS 4,566,122 A * 1/1986 Samyn .................. G01N 22/00
340/600
5,719,948 A * 2/1998 Liang ............................ 382/112
(Continued)

FOREIGN PATENT DOCUMENTS

GB 2334574 A * 2/1998 ............... G07D 7/00

*Primary Examiner* — Jeffrey Shapiro
(74) *Attorney, Agent, or Firm* — Baker Botts L.L.P.

(57) ABSTRACT

A bank note processing system having a combined florescence and phosphorescence detection system. The bank note processing system includes a detection module which has a detector housing having a first compartment and a second compartment separated by a light baffle. An illumination source and a first sensor module are disposed in the first compartment of the detector housing and a second sensor module is disposed in the second compartment of the detector housing. The illumination source directs light to the bank note and the first sensor module measures the bank note's florescence at a first point in time. The second sensor module measures the bank note's phosphorescence at a second point in time and the detection module determines whether the bank note is a counterfeit bank note using the measured florescence and the measured phosphorescence.

16 Claims, 2 Drawing Sheets

Figure 1:
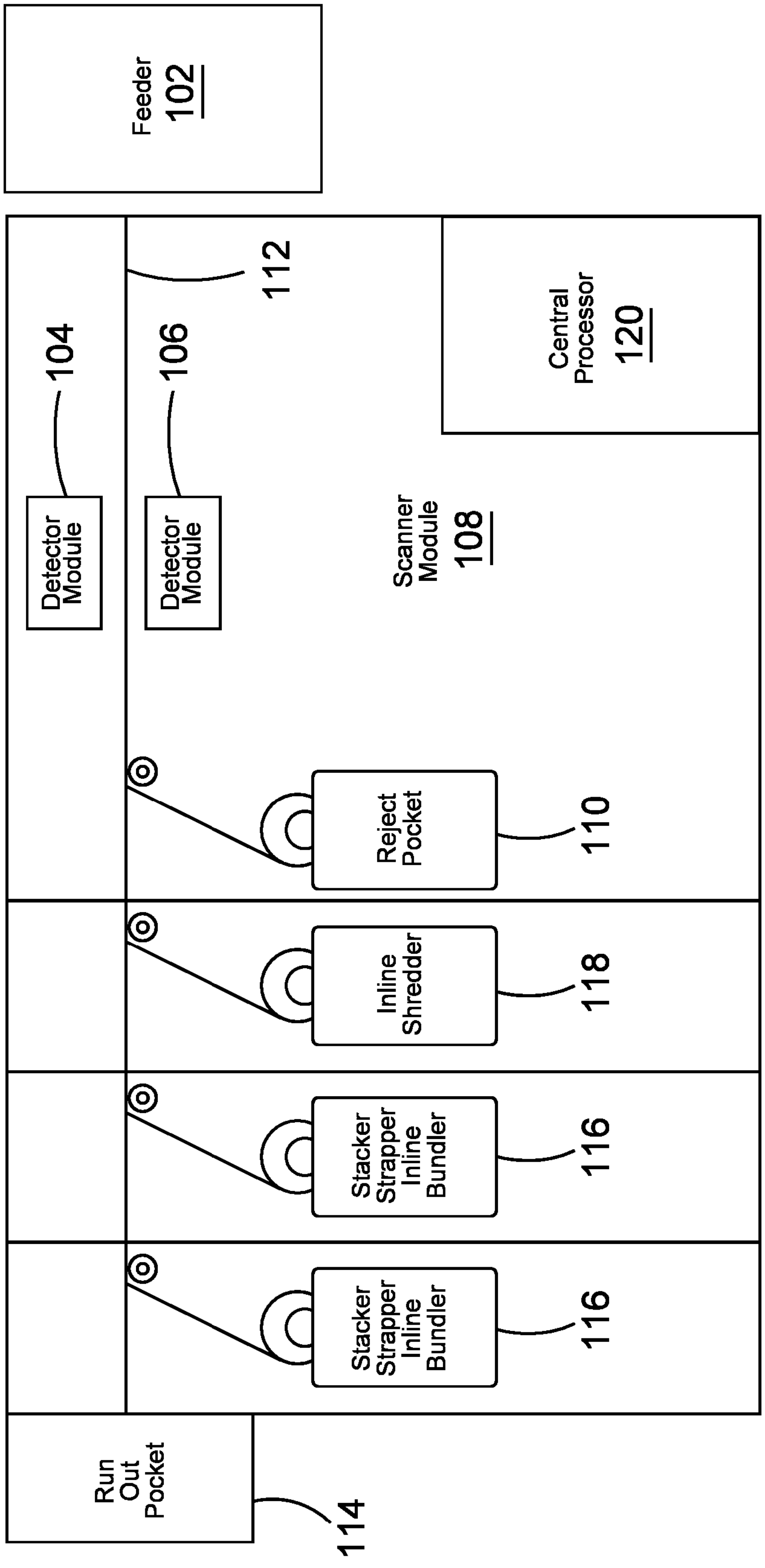

(51) Int. Cl.
*G06K 9/00* (2006.01)
*G07D 7/00* (2016.01)
*G07D 7/12* (2016.01)
*G07D 11/00* (2006.01)
*G07D 7/06* (2006.01)
*G07D 7/121* (2016.01)
*G07D 7/202* (2016.01)

(52) U.S. Cl.
CPC ............... *G07D 7/06* (2013.01); *G07D 7/121* (2013.01); *G07D 7/205* (2013.01)

(58) Field of Classification Search
USPC .................. 194/206, 207; 209/534; 235/379; 382/135
See application file for complete search history.

(56) References Cited

U.S. PATENT DOCUMENTS 6,101,266 A * 8/2000 Laskowski et al. .......... 382/135
6,142,284 A * 11/2000 Saltsov ............. G07D 11/0081 194/207
2001/0035501 A1* 11/2001 Taylor .................... G01N 21/64 250/461.1
2006/0169785 A1* 8/2006 Jones ..................... B42D 25/00 235/491
2007/0295812 A1* 12/2007 Mazowiesky .......... G07D 7/121 235/454
2009/0294243 A1* 12/2009 Charych et al. .............. 194/206
2011/0052085 A1* 3/2011 Ikari et al. .................... 382/224

* cited by examiner

BANK NOTE PROCESSING SYSTEM HAVING A COMBINED FLORESCENCE AND PHOSPHORESCENCE DETECTION SYSTEM

BACKGROUND OF THE INVENTION

1. Field of the Invention

The present invention relates to automated currency processing and, more specifically, to a bank note processing system having a combined florescence and phosphorescence detection system.

2. Description of Related Art Including Information Disclosed Under 37 CFR 1.97 and 1.98

Automated currency processors or bank note processing machines are common in the fields of bulk currency processing and are typically used by central banks, large commercial banks, print works, cash in transit, or other entities that require processing of large amounts of currency.

In operation, bank notes that require processing are fed into the automated currency processing machine by a feeder. The term "bank note" (or "note") as used herein may generally include bills of different currencies, checks, or other instruments that are typically processed by a banking entity. The bank notes then travel down a conveyor past a number of detector modules which detect various characteristics of the bank note. For instance, the detector modules may determine denomination, authenticity, bank note condition, or other desired characteristics of a bank note. Based on the characteristics detected, the bank note may then be routed to a number of different pockets for collation or destruction. These pockets may enable the automated currency processing machine to sort notes by fitness level, denomination, origin, authentication, or other desired characteristics.

Typically, a bank note processing machine may include a first detector module that may be used to detect florescence and a second detector module that may be used to detect phosphorescence. A particular bank note with a particular type of ink would have a known level of florescence and phosphorescence. Accordingly, taken together, the florescence and phosphorescence detected by the first detector module and the second detector module may be used to determine whether the bank note being processed is a counterfeit bank note or possibly a worn bank note. It is desirable to develop a bank note processing machine that can use a single detector module to detect both florescence and phosphorescence.

BRIEF DESCRIPTION OF THE SEVERAL VIEWS OF THE DRAWING(S)

Figure 2:
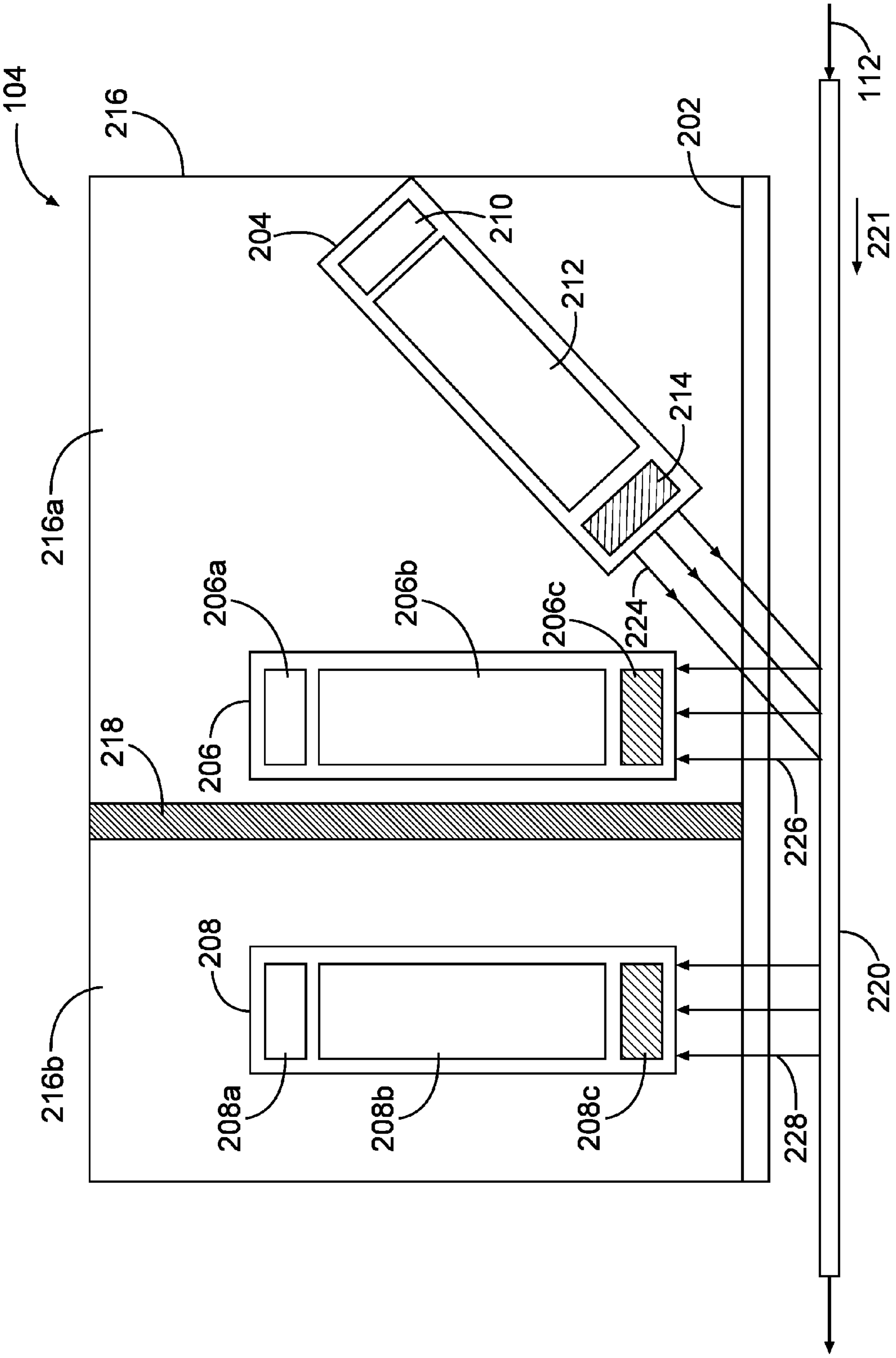

The present invention will be more fully understood by reference to the following detailed description of the preferred embodiments of the present invention when read in conjunction with the accompanying drawings, in which like reference numbers refer to like parts throughout the views, wherein:

FIG. 1 depicts a block diagram of a basic bank note processing machine, illustrating the location of detectors within the processing stream; and FIG. 2 depicts a close up view of a counterfeit detector module in accordance with an illustrative embodiment of the present disclosure.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

DETAILED DESCRIPTION OF THE INVENTION

Illustrative embodiments of the present disclosure are described in detail herein. In the interest of clarity, not all features of an actual implementation may be described in this specification. It will of course be appreciated that in the development of any such actual embodiment, numerous implementation specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure. To facilitate a better understanding of the present disclosure, the following examples of certain embodiments are given. In no way should the following examples be read to limit, or define, the scope of the disclosure.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), flash memory; and/or any combination of the foregoing.

The terms "couple" or "couples," as used herein are intended to mean either an indirect or a direct connection. Thus, if a first device couples to a second device, that connection may be through a direct connection, or through an indirect mechanical or electrical connection via other devices and connections. Similarly, if a first device is communicatively coupled to a second device, the two devices may be able to communicate with one another directly or indirectly over any suitable wired or wireless communication network.

The term "florescence" as used herein refers to the simultaneous emission of light with the wave length shifted by a substance that has absorbed light or other electromagnetic radiation. The term "phosphorescence" as used herein refers to emission of light whose intensity decreases over time from a substance following exposure to and removal of incident radiation.

FIG. 1 depicts a block diagram of a bank note processing machine according to one embodiment of the present disclosure, highlighting the location of the detector modules with respect to the processing stream. A bank note is first stripped from a stack of notes in the feeder (102) and sent along a transport path (112) to the scanner module (108). Within the scanner module (108) is an area centered on the transport path (112) in which one or more detectors modules (104, 106) may be located. The detector modules (104, 106) may be any suitable detectors known to those of ordinary skill in the art, having the benefit of the present disclosure. For instance, in certain illustrative embodiments, the detector modules (104, 106) may be ultraviolet detectors which may check the note for soiling. In accordance with certain illustrative embodiments of the present disclosure, at least one of the detector modules (e.g., 104) may be a detection module having a combined florescence and phosphorescence sensor as discussed in more detail in conjunction with FIG. 2 below. The detector modules in the scanner module (108) may be used to identify counterfeit bank notes, damaged bank notes or other desirable characteristics.

Moreover, although two detector modules (104, 106) are shown in FIG. 1, the present disclosure is not limited to any specific number of detector modules. Accordingly, fewer or more detector modules may be used without departing from the scope of the present disclosure.

The bank notes may travel along the transport path (112) past the detector modules (104, 106). The bank notes are then directed to a final disposition component, which may comprise a pocket (114) for collection of processed bank notes, one or more strappers (116) for strapping the bank notes in bundles, and a means for depositing the bank notes into the pocket by pulling the bank notes from the bank note processing path or transport device. For instance, in certain implementations, counterfeit bank notes identified by the detection module (104) may be directed to a designated pocket (110) where they may be inspected and/or rejected or they may be directed to an inline shredder (118) where they may be shredded.

Processing of the bank notes may be controlled by a central processor (120), which may be an information handling system that controls the timing of the system as well as activation of the detectors and control of bank note disposition. The central processor (120) may either be a single processing unit or it may consist of multiple processors. Computer-readable media may also be present, providing storage capacity for the computer code which controls the processor's actions as well as other parameters relating to operation of the system. The central processor (120) is capable of running the stored program steps from the accessible memory. As discussed above, the information handling system acting as the central processor (120) may be a dedicated general purpose computer, an embedded RISC or CISC computer processor, a DSP, or the like.

FIG. 2 depicts a close up view of a detection module (104) in accordance with illustrative embodiments of the present disclosure. As shown in FIG. 2, a transparent window (202) may be disposed at the interface of the detection module (104) and the transport path (112). The detector module may further comprise an illumination source (204), a first sensor module (206) and a second sensor module (208).

In accordance with certain illustrative embodiments of the present disclosure, the illumination source (204) may be a strobe lamp which generates "flashes" of light at a predetermined frequency. As shown in the illustrative embodiment of FIG. 2, the illumination source (204) may include an emission source (210), emitter optics (212) and optionally an emitter filter (214). Specifically, in certain implementations, the emitter filter (214) may only be included if a wide band emission source (210) is used. As shown in FIG. 2, the emitter filter (214) is disposed on the side of the illumination source (204) adjacent to the transport path (112).

As discussed in further detail below, the identification of counterfeit bank notes is accomplished by illuminating the bank note using the illumination source (204) and then obtaining the resulting florescence and phosphorescence emissions from the bank note. Accordingly, it is important that the different components of the detector module be isolated to avoid unwanted interference of the various emissions. Therefore, in certain illustrative embodiments, the illumination source (204), the first sensor (206) and the second sensor (208) may be disposed in a detector housing (216) which may be lightproof.

As shown in FIG. 2, a light baffle (218) may divide the detector housing (216) into two separate compartments denoted as (216A) and (216B). The illumination source (204) and the first sensor module (206) may be disposed within the first compartment (216A) and the second sensor module (208) may be disposed within the second compartment (216B). Further, as shown in FIG. 2, the first sensor module (206) may include a sensor (206A), sensor optics (206B) and a wave length specific filter (206C). Similarly, the second sensor module (208) may include a sensor (208A), sensor optics (208B) and a wave length specific filter (208C). The wave length specific filters (206C and 208C) help ensure that only light of predetermined wavelengths emitted from a bank note is analyzed by the sensors (206A and 208A).

In accordance with an illustrative implementation of the present disclosure, a bank note (222) is directed along the transport path (112) in the direction shown by the arrow (221). As the bank note (220) moves along the transport path (112), the illumination source (204) directs a light of a particular wavelength onto the bank note (220). This incident light is denoted by arrows (224). The first sensor module (206) immediately measures the bank note's florescence by analyzing the resulting emission from the bank note (220) denoted by arrows (226). The detected florescence measurement provides a measure of the emission of light by the bank note (220) as a result of the incident light (224) from the illumination source (204). A particular bank note with a particular type of ink would have a particular known level of florescence for a given incident light (224) that could be used to determine if the bank note is counterfeit.

After the light from the illumination source (204) is strobed off and as the bank note (220) is moved along the transport path (112), the bank note (220) reaches the second sensor module (208). As shown in FIG. 2, the second sensor module (208) is located downstream relative to the first sensor module (206) and the illumination source (204) so that there is a time delay between the point in time when the incident light (224) is directed to the bank note (220) and the point in time when the same portion of the bank note reaches the second sensor module (208). The distance between the first sensor module (206) and the second sensor module (208) may be adjusted by the user as desired to achieve a particular time delay for measuring the phosphorescence effect resulting from the incident light (224). Accordingly, the second sensor module (208) measures the phosphorescence effect (denoted by arrows (228)) from the bank note (220) resulting from the incident light (224) after a time delay corresponding to the position of the second sensor module (208) along the transport path (112) relative to illumination source (204). Like florescence, a particular bank note with a particular type of ink would have a particular known level of phosphorescence for a given incident light that could be used to determine if the bank note is counterfeit. Taken together, the florescent and phosphorescent characteristics of the bank note obtained by the sensor modules (206 and 208) of the detector module (104) can provide a reliable indication of whether the bank note is counterfeit. If it is determined that the bank note is counterfeit, the bank note processing machine will process the bank note as desired.

Accordingly, the illumination source (204) directs light to a bank note that is to be analyzed. The first sensor module (206) then measures the bank note's florescence at a first point in time. Once the illumination source (204) is strobed off and after a certain time delay resulting from the placement of the second sensor module (208) downstream relative to the illumination source (204) and the first sensor module (206), the second sensor module (208) measures the bank note's phosphorescence at a second point in time. The detection module (104) then determines whether the bank note is a counterfeit bank note using the measured florescence and phosphorescence. Moreover, in certain embodiments, the second sensor module (208) may be configured to obtain phosphorescence measurements at several points in time after the illumination source (204) is strobed off. The multiple phosphorescence measurements may then be analyzed to yield a more accurate determination of whether the bank note is counterfeit.

In accordance with certain illustrative embodiments, the detection module (104) may be communicatively coupled to an information handling system which may control the operation of the illumination source (204), the first sensor module (206) and the second sensor module (208). Moreover, the information handling system may process the florescence and phosphorescence measurements from the sensor modules (206 and 208) and use them to determine if the bank note is a counterfeit bank note. In certain illustrative embodiments, the information handling system may process the florescence and phosphorescence measurements in accordance with an algorithm that may be stored in a computer-readable medium that is coupled to the information handling system. In certain illustrative embodiments, the information handling system may be the central processor (120).

Therefore, the present invention is well-adapted to carry out the objects and attain the ends and advantages mentioned as well as those which are inherent therein. While the invention has been depicted and described by reference to exemplary embodiments of the invention, such a reference does not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects. The terms in the claims have their plain, ordinary meaning unless otherwise explicitly and clearly defined by the patentee.

I claim:

1. A method of identifying a counterfeit bank note comprising:

directing a bank note to a detection module along a transport path;

directing light to the bank note;

a strobe lamp;

measuring a florescence from the bank note in response to the light from the strobe lamp using a first sensor module;

strobing off the strobe lamp;

measuring, while the strobe lamp is off, phosphorescence measurements from the bank note in response to the light from the illumination source using a second sensor module at a distance from the first sensor module after the florescence was measured, the distance between the first sensor module and the second sensor module being adjustable;

determining if the bank note is a counterfeit bank note by analyzing the florescence and the phosphorescence measurements.

2. The method of claim 1, further comprising dividing the detection module into a first compartment and a second compartment;

disposing the first sensor module and the illumination source in the first compartment; and disposing the second sensor module in the second compartment.

3. The method of claim 1, where directing light to the bank note from an illumination source comprises emitting light from an emission source and directing the light from the emission source through an emitter filter.

4. A detection module comprising:

a detector housing having a first compartment and a second compartment disposed adjacent a bank note transport path;

a strobe lamp disposed in the first compartment, wherein the strobe lamp directs an incident light to a bank note passing along the transport path;

a first sensor module disposed in the first compartment, wherein the first sensor module measures florescence emitted by the bank note in response to the incident light;

a second sensor module disposed in the second compartment, wherein the second sensor module measures, while the strobe lamp is off, phosphorescence emitted by the bank note in response to the incident light at a distance from the first sensor module after florescence was measured, the distance between the first sensor module and the second sensor module being adjustable; and an information handling system, wherein the information handling system uses the measured florescence and the measured phosphorescence to determine if the bank note is a counterfeit bank note.

5. The detection module of claim 4, wherein a light baffle divides the detector housing into the first compartment and the second compartment.

6. The detection module of claim 4, wherein the second sensor module is disposed downstream relative to the first sensor module.

7. The detection module of claim 4, wherein the illumination source comprises an emission source, emitter optics, and an emitter filter.

8. The detection module of claim 4, wherein the first sensor module comprises a sensor, sensor optics and a wave length specific filter.

9. The detection module of claim 4, wherein the second sensor module comprises a sensor, sensor optics and a wave length specific filter.

10. The detection module of claim 4, further comprising a transparent window disposed at an interface of the detection module and the bank note transport path.

11. A bank note processing system having a detection module for analyzing a bank note, the detection module comprising:

a detector housing having a first compartment and a second compartment separated by a light baffle;

a strobe lamp and a first sensor module disposed in the first compartment of the detector housing; and a second sensor module disposed in the second compartment of the detector housing;

wherein the strobe lamp directs light to the bank note;

wherein the first sensor module measures the bank note's florescence;

wherein the distance between the first sensor module and the second sensor module is adjustable;

wherein the second sensor module measures, while the strobe lamp is off, the bank note's phosphorescence after the bank note's florescence was measured; and wherein the detection module determines whether the bank note is a counterfeit bank note using the measured florescence and the measured phosphorescence.

12. The detection module of claim 11, wherein the second sensor module is disposed downstream relative to the first sensor module.

13. The detection module of claim 11, wherein the illumination source comprises an emission source, emitter optics, and an emitter filter.

14. The detection module of claim 11, wherein the first sensor module comprises a sensor, sensor optics and a wave length specific filter.

15. The detection module of claim 11, wherein the second sensor module comprises a sensor, sensor optics and a wave length specific filter.

16. The detection module of claim 11, further comprising a transparent window disposed at an interface of the detection module and the bank note transport path.

* * * * *